United States Patent
Marton et al.

(10) Patent No.: US 10,360,376 B2
(45) Date of Patent: Jul. 23, 2019

(54) METHOD FOR OPERATING A COMPUTER UNIT, AND SUCH A COMPUTER UNIT

(71) Applicant: GIESECKE & DEVRIENT GMBH, München (DE)

(72) Inventors: Laszlo Marton, Poing (DE); Oliver Mihatsch, München (DE)

(73) Assignee: GIESECKE+DEVRIENT MOBILE SECURITY GMBH, Munich (DE)

( * ) Notice: Subject to any disclaimer, the term of this patent is extended or adjusted under 35 U.S.C. 154(b) by 85 days.

(21) Appl. No.: 15/537,585

(22) PCT Filed: Dec. 14, 2015

(86) PCT No.: PCT/EP2015/002514
§ 371 (c)(1),
(2) Date: Jun. 19, 2017

(87) PCT Pub. No.: WO2016/096118
PCT Pub. Date: Jun. 23, 2016

(65) Prior Publication Data
US 2018/0268131 A1     Sep. 20, 2018

(30) Foreign Application Priority Data

Dec. 17, 2014   (DE) ........................ 10 2014 018 892

(51) Int. Cl.
*G06F 21/53*     (2013.01)
*G06F 21/71*     (2013.01)
(Continued)

(52) U.S. Cl.
CPC ............ *G06F 21/53* (2013.01); *G06F 21/602* (2013.01); *G06F 21/71* (2013.01); *H04W 12/02* (2013.01)

(58) Field of Classification Search
CPC ........ G06F 21/53; G06F 21/602; G06F 21/71; G06F 21/70; H04W 12/02
See application file for complete search history.

(56) References Cited

U.S. PATENT DOCUMENTS

2004/0223607 A1   11/2004 Griffin et al.
2007/0011736 A1*   1/2007 Kalibjian ............... G06F 21/52
                                                        726/14
(Continued)

FOREIGN PATENT DOCUMENTS

| DE | 102013006470 A1 | 10/2014 |
|---|---|---|
| DE | 102013006621 A1 | 10/2014 |
| WO | 2014047135 A2 | 3/2014 |

OTHER PUBLICATIONS

German Search Report for corresponding German Application No. 102014018892.2, dated Sep. 16, 2015.
(Continued)

*Primary Examiner* — Amir Mehrmanesh
(74) *Attorney, Agent, or Firm* — Workman Nydegger

(57) ABSTRACT

A method is supplied for operating a computer unit, wherein on the computer unit an application can be executed which can access the functions of a crypto API, wherein the functions of the crypto API can be supplied by at least one crypto implementation on the computer unit. The method therein includes the following steps of: executing the application on the computer unit; checking what crypto implementations are available on the computer unit; and selecting one of the available crypto implementations as that crypto implementation which supplies the functions of the crypto API.

11 Claims, 2 Drawing Sheets

(51) Int. Cl.
  *G06F 21/60*    (2013.01)
  *H04W 12/02*    (2009.01)

(56) References Cited

U.S. PATENT DOCUMENTS

2015/0244685 A1* 8/2015 Shah .................... G06F 21/602
                                                            713/155
2016/0072825 A1   3/2016 Dietze et al.
2017/0262638 A1* 9/2017 Horowitz ............ G06F 17/3056

OTHER PUBLICATIONS

International Search Report for corresponding International PCT Application No. PCT/EP2015/002514, dated Feb. 15, 2016.

* cited by examiner

METHOD FOR OPERATING A COMPUTER UNIT, AND SUCH A COMPUTER UNIT

FIELD OF THE INVENTION

The invention relates to a method for the secure operation of a computer unit as well as such a computer unit.

BACKGROUND OF THE INVENTION

Increasingly, computer units, for example in the form of a tablet computer or a smart phone, are employed for carrying out digital transactions, such as for example the purchase of a good or a service from an online mail order company or the cashless payment at an NFC terminal. When such a digital transaction is carried out, usually a software application (briefly referred to as "app") implemented on the computer unit interacts with a terminal or server. Frequently, it is a cryptographic algorithm, for example an encryption algorithm, part of the software application implemented on the computer unit, that accesses security-critical data, for example PINs, passwords, keys, etc.

A relatively new approach for protecting security-critical data on a computer unit is based on the idea of supplying a secure runtime environment in the form of a secure and/or hardened operating system on the computer unit in addition to a conventional operating system of the computer unit. Such a secure runtime environment is known to the person skilled in the art also under the term "firmware-based trusted execution environment" or briefly "TEE". A firmware-based trusted execution environment differs from an ordinary TEE in that the NEE and TEE are run on the same CPU.

The object of the present invention is to supply an improved method for operating a computer unit with a secure runtime environment, as well as such a computer unit.

SUMMARY OF THE INVENTION

According to a first aspect of the invention a method for operating a computer unit is supplied, wherein on the computer unit an application can be executed which can access the functions of a crypto API, wherein the functions of the crypto API can be supplied by at least one crypto implementation on the computer unit. Therein the method includes the following steps of: executing the application on the computer unit; checking what crypto implementations are available on the computer unit; and selecting one of the available crypto implementations, preferably by means of a provider selection mechanism, as that crypto implementation which supplies the functions of the crypto API.

Preferably in the step of selecting one of the available crypto implementations as that crypto implementation which supplies the functions of the crypto API, the most secure one of the available crypto implementations is selected.

According to preferred embodiments of the invention, the method includes, before the step of executing the application on the computer unit, the further step of downloading the application from an online software platform.

Preferably at least one of the crypto implementations is implemented in a secure runtime environment of the computer unit.

According to preferred embodiments of the invention the application is a Java application, the crypto API is a JCE and the at least one crypto implementation is at least one crypto provider.

According to a second aspect of the invention, a computer unit is supplied on which an application can be executed which can access the functions of a crypto API, wherein the functions of the crypto API can be supplied by at least one crypto implementation on the computer unit. Therein the computer unit is configured to: check, upon execution of the application on the computer unit, what crypto implementations are available on the computer unit; and select one of the available crypto implementations, preferably by means of a provider selection mechanism, as that crypto implementation which supplies the functions of the crypto API.

Preferably, the computer unit is configured to select the most secure crypto implementation as that crypto implementation which supplies the functions of the crypto API.

According to preferred embodiments of the invention, the computer unit is configured to download the application from an online software platform.

Preferably at least one of the crypto implementations is implemented in a secure runtime environment of the computer unit.

According to preferred embodiments of the invention, the application is a Java application, the crypto API is a JCE and the at least one crypto implementation is at least one crypto provider.

BRIEF DESCRIPTION OF THE DRAWINGS

Further features, advantages and objects of the invention are indicated in the following detailed description of several exemplary embodiments and alternative embodiments. Reference is made to the figures, wherein there is shown.

DETAILED DESCRIPTION OF VARIOUS EMBODIMENTS

Figure 1:
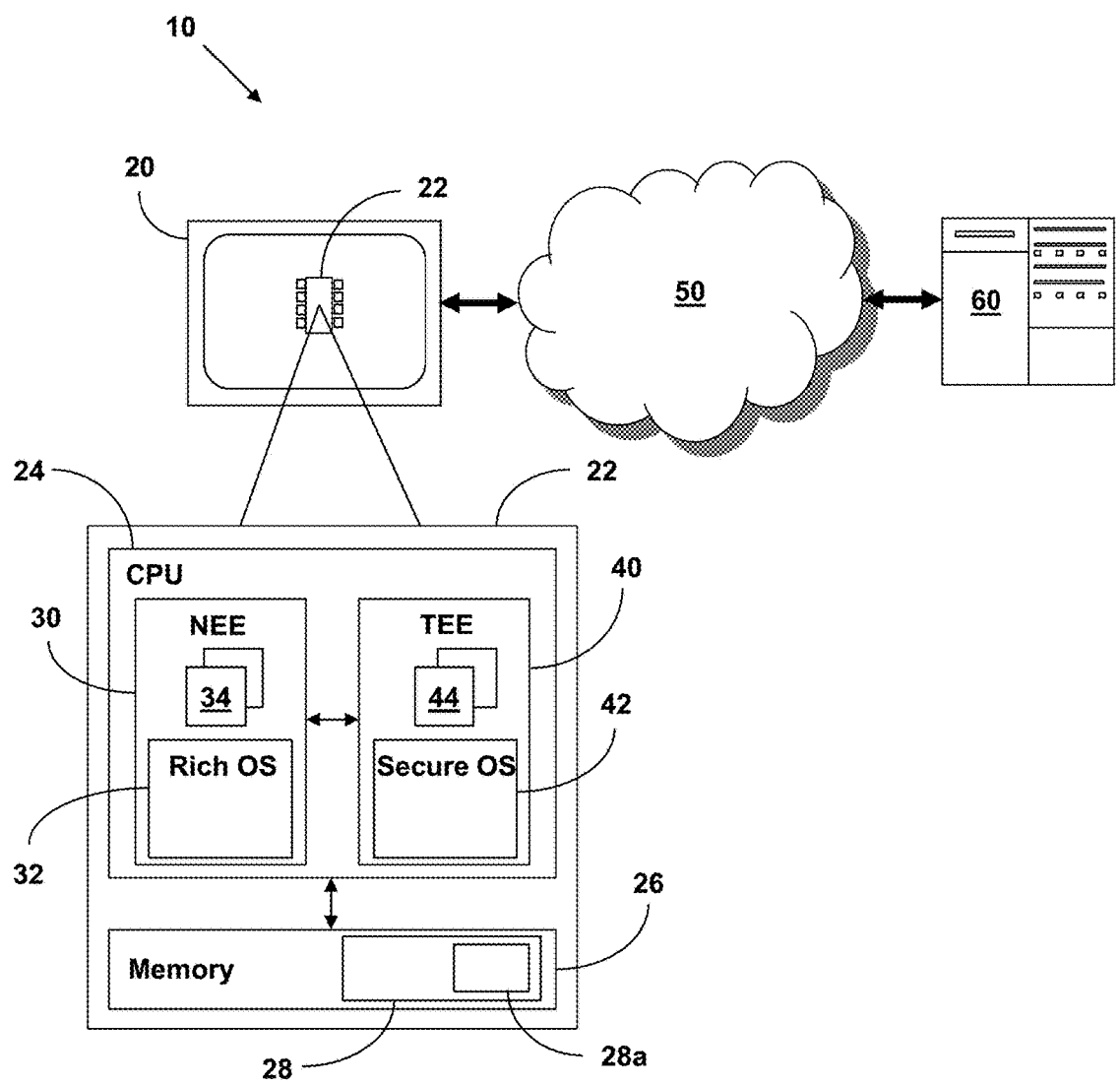
FIG. 1 a schematic representation of a computer unit with a secure runtime environment in communication with a server, illustrating different aspects of the present invention, FIG. 2 a schematic representation of a preferred software architecture with two different crypto providers, which is implemented on the computer unit of FIG. 1, and FIG. 3 a schematic representation of carrying out a cryptographic operation with the two different crypto providers of FIG. 2.

FIG. 1 shows a schematic representation of a computer unit 20, preferably the like in the form of a tablet computer, a smart phone or the like, which forms part of a communication system 10. The computer unit 20 is configured to communicate with a server or a terminal 60 via a communication channel 50. The communication channel 50 can be the Internet, a mobile communication network, an NFC channel or the like. The server 60 could be an NFC terminal of a service provider with which a software application, for example the software applications 34 or 44, can carry out transactions on the computer unit 20, for example a payment transaction in which the software application on the computer unit 20 performs a payment process.

The computer unit 20 has a chip 22 with a central processing unit (CPU), for example in the form of a microprocessor 24. It is known that among the primary tasks of the processor 24 there are the execution of arithmetic and logic functions and the reading and writing of data elements, as defined in the form of machine commands by a software application running on the processor 24. For the sake of clarity, a preferred architecture of the processor 24 in FIG. 1 is again represented schematically in detail outside the mobile terminal 20.

The processor 24 is in a communication connection with a memory unit 26, which preferably includes a volatile working memory (RAM) 28, for example for accommodating the machine commands of a software application to be executed by the processor 24. As will be described in detail below in connection with the FIGS. 2 and 3, the RAM 28 preferably has a specially secured area 28a, so that the RAM is composed of a normal RAM 28, and a secure RAM 28a.

Preferably, the memory unit 26 further includes a non-volatile, preferably rewritable memory, for example to accommodate in the unpowered state of the computer unit 20 the machine commands of a software application to be executed by the processor 24. Preferably the non-volatile, rewritable memory is a flash memory (flash EEPROM). It can be a flash memory with a NAND or a NOR architecture for example. Of course, the memory unit 26 can also include a read only memory (ROM).

As represented schematically in FIG. 1, in the processor 24 at runtime there are implemented a normal, unsecured runtime environment 30 (also referred to as "normal execution environment" or briefly "NEE") and a secure runtime environment 40 (also referred to as "trusted execution environment" or briefly TEE), i.e. the processor 24 supplies a "normal", usually untrusted area and a "secure", trusted area. It is monitored therein whether the processor 24 is operated in the trusted area (TEE) or in the untrusted area (NEE). Further, a switchover between the trusted and the untrusted area is monitored. A secure runtime environment or TEE within the meaning of the invention is offered for example by the company "Trustonic".

In the preferred embodiment described here, a secure operating system (secure OS) runs on the TEE 40. In contrast, the normal runtime environment NEE 30 contains a conventional operating system 32.

In the preferred case that the computer unit 20 is a tablet computer, the operating system 32 implemented in the normal runtime environment NEE 30 is a so-called "rich OS" with a wide range of functions. Such an operating system of the computer unit 20 can be, for example, Android, Apple iOS, Windows or the like.

The TEE 40 serves to execute security-critical applications with the aid of the computer unit 20. Therein the secure runtime environment TEE 40 is isolated from the normal runtime environment NEE 30 and encapsulates security-critical applications, whereby an efficient protection is achieved against unauthorized third-party attacks. Exemplarily, the security-critical application 44 runs in the TEE 40 in the preferred embodiment in FIG. 1. In contrast hereto, conventional applications run in the normal runtime environment NEE 30, wherein in FIG. 1 an application 34 is designated exemplarily. The applications from the untrusted area NEE 30, for example the application 34, usually do not have direct access to the applications in the trusted area TEE 40, for example the application 44.

Figure 2:
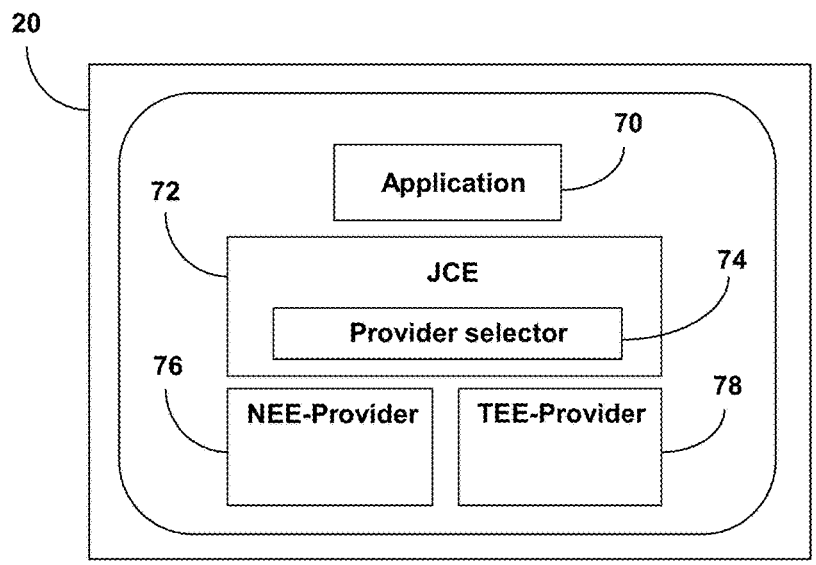

FIG. 2 shows a preferred software architecture, on which an application running on the processor 24, for example the application 70 shown in FIG. 2, can be based. According to preferred embodiments of the invention, the application 70 is a Java application that can be executed in a Java runtime environment implemented on the computer unit 20. As is known to the person skilled in the art, the Java runtime environment makes available a multiplicity of Java APIs, for example in the form of the "Java Platform, Standard Edition," which the application 70 can access. The JCE 72 (Java Cryptography Extension) represented in FIG. 2 forms part of the "Java Platform, Standard Edition", said JCE permitting to carry out cryptographic operations, such as for example the encryption or decryption of data with a cryptographic key. For carrying out the functions made available by the JCE 72, the JCE makes use of a crypto provider (also known as "cryptographic service provider"). Substantially, a crypto provider consists of a multiplicity of software packages containing specific implementations of the cryptographic functions and algorithms that are made available to the application 70 by the JCE 72. A standard crypto provider is made available by the company "Oracle", for example.

According to the invention, in the JCE 72 a provider selection mechanism ("provider selector") 74 is provided which allows selecting a crypto provider among several available crypto providers for carrying out a function of the JCE 72 requested by the application. Preferably, the provider selection mechanism 74 of the JCE is 72 therein is configured such that, if a TEE crypto provider is available, such as for example the TEE provider 78 in FIG. 2, which can access functionalities in the TEE 40 and the NEE 30, said provider is preferred to a conventional crypto provider, such as for example the NEE provider in FIG. 2 which can merely access functions in the NEE 30. According to preferred embodiments of the invention, the provider selection mechanism 74 of the JCE 72 is thus configured such that in each case that crypto provider is selected which has the highest security level.

A major difference between a TEE crypto provider, such as the TEE provider 78 in FIG. 2, and a conventional crypto provider, such as the NEE provider in FIG. 2, within the meaning of the present invention will be illustrated below with reference to FIG. 3 by the example of a cryptographic operation by means of a key to be kept secret, said operation being made available to the application 70 by the JCE 72 and being implemented differently in the TEE provider 78 and the NEE provider 76.

Figure 3:
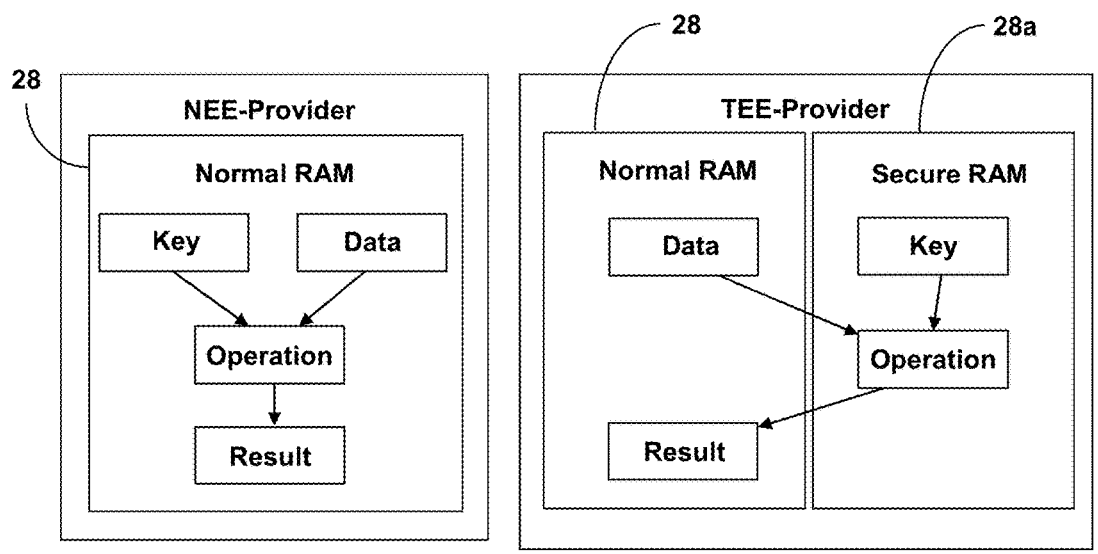

On the left side of FIG. 3, the process of a cryptographic operation in the RAM of the computer unit 20 by means of a key to be kept secret is represented schematically, as said operation is implemented in the NEE provider 76. In this case, both the data incorporated into the operation and the key to be employed for this purpose are present in the RAM 26 of the computer unit 20. Likewise, any intermediate results of the cryptographic operation and the final result of the operation are present at least temporarily in the RAM 26. Since the NEE provider 76 is operated in the NEE 30 and the key of the cryptographic operation is present at least temporarily in the normal, i.e. not specifically secured RAM 26, the key can be tapped fairly effortlessly by an attacker, for example by freezing the state of the computer unit 20 and reading out the normal RAM 26.

In contrast hereto, on the right side of FIG. 3, the process of the cryptographic operation in the RAM of the computer unit 20 by means of a key to be kept secret is represented schematically, as said operation is implemented in the TEE provider 78. In this case, merely the data incorporated into the cryptographic operation and the result of the cryptographic operation are present in the normal RAM 26 of the computer unit 20. In contrast, the key to be kept secret and the intermediate results of the cryptographic operation, which possibly allow inferring the key to be kept secret, are processed only in the secure RAM 28a of the computer unit 20 which is managed by the TEE 40 and which thus cannot be accessed from the NEE 30.

According to preferred embodiments of the invention it is provided that the provider selection mechanism 74 is supplied together with the JCE 72 as part of an application that accesses functions of the JCE. When a developer supplies such an application expanded according to the invention on an online software platform, for example in the Google PlayStore, for download to computer units unknown to him, such as diverse smart phones, tablet computers and the like, the provider selection mechanism 74 according to the invention permits selecting that crypto provider available on a given computer unit 20 which offers the best possible security.

Although the foregoing preferred embodiments have been described in the context of the "Java Cryptographic Extension", the person skilled in the art will appreciate that the provider selection mechanism according to the invention can be employed advantageously also in connection with different crypto APIs, such as for example the "Microsoft Cryptography API: Next Generation (CNG)".

The invention claimed is:

1. A method for operating a computer unit, the method comprising the following steps of:
 providing a computer unit configured such that an application is executable on the computer unit that accesses the functions of a crypto API, wherein the functions of the crypto API are supplied by at least one crypto implementation on the computer unit;
 executing the application on the computer unit;
 checking what crypto implementations are available on the computer unit, wherein at least one of the crypto implementations is implemented in a secure runtime environment of the computer unit; and
 selecting one of the available crypto implementations as that crypto implementation which supplies the functions of the crypto API, said selecting including selecting the most secure one of the available crypto implementations;
wherein data incorporated into a cryptographic operation and a result of the cryptographic operation are present in a normal memory of the computer unit, and a cryptographic key and an intermediate result of the cryptographic operation are processed only in a secure memory of the computer unit,
wherein the normal memory of the computer unit in which the data incorporated into the cryptographic operation and the result of the cryptographic operation are present is managed by a normal runtime environment,
wherein the secure memory of the computer unit is managed by the secure runtime environment, and
wherein the secure memory of the computer unit cannot be accessed from the normal runtime environment.

2. The method according to claim 1, wherein, prior to the step of executing the application on the computer unit, the method includes the further step of downloading the application from an online software platform.

3. The method according to claim 1, wherein the application is based on an object-oriented programming language, the crypto API is a Java Cryptography Extension (JCE) and the at least one crypto implementation is at least one crypto provider.

4. The method according to claim 1, wherein the application is based on a software framework, the crypto API is a Microsoft crypto API and the at least one crypto implementation is at least one crypto provider.

5. The method according to claim 1, wherein a secure operating system runs on the secure runtime environment.

6. The method according to claim 1, wherein the normal runtime environment contains a conventional operating system.

7. The method according to claim 1, wherein the normal runtime environment is an unsecured runtime environment.

8. A computer unit configured such that:
 an application can be executed on the computer unit that accesses functions of a crypto API, wherein the functions of the crypto API are supplied by at least one crypto implementation on the computer unit, wherein the computer unit is further configured to
 check, upon executing the application on the computer unit, what crypto implementations are available on the computer unit, wherein at least one of the crypto implementations is implemented in a secure runtime environment of the computer unit; and
 select one of the available crypto implementations as that crypto-implementation which supplies the functions of the crypto API,
wherein the computer unit is configured to select the most secure crypto implementation as that crypto implementation which supplies the functions of the crypto API,
wherein the computer unit is further configured such that data incorporated into a cryptographic operation and a result of the cryptographic operation are present in a normal memory of the computer unit, and a cryptographic key and an intermediate result of the cryptographic operation are processed only in a secure memory of the computer unit,
wherein the normal memory of the computer unit in which the data incorporated into the cryptographic operation and the result of the cryptographic operation are present is managed by a normal runtime environment,
wherein the secure memory of the computer unit is managed by the secure runtime environment, and
wherein the secure memory of the computer unit cannot be accessed from the normal runtime environment.

9. The computer unit according to claim 8, wherein the computer unit is configured to download the application from an online software platform.

10. The computer unit according to claim 8, wherein the application is based on an object-oriented programming language, the crypto API is a Java Cryptography Extension (JCE) and the at least one crypto implementation is at least one crypto provider.

11. The computer unit according to claim 8, wherein the application is based on a software framework, the crypto API is a Microsoft crypto API and the at least one crypto implementation is at least one crypto provider.

* * * * *